(12) United States Patent
Wolf

(10) Patent No.: US 11,754,212 B2
(45) Date of Patent: Sep. 12, 2023

(54) CONNECTION FITTING FOR A VALVE COUPLING AND/OR TEST COUPLING FOR FLUID SYSTEMS FOR DETECTING FLUID PRESSURES AND FOR FILLING, EMPTYING AND VENTING FLUID SYSTEMS

(71) Applicant: Hydrotechnik GmbH, Limburg an der Lahn (DE)

(72) Inventor: Thomas Wolf, Waldbrunn (DE)

(73) Assignee: Hydrotechnik GmbH, Limburg an der Lahn (DE)

( * ) Notice: Subject to any disclaimer, the term of this patent is extended or adjusted under 35 U.S.C. 154(b) by 0 days.

(21) Appl. No.: 17/775,328

(22) PCT Filed: Jan. 28, 2021

(86) PCT No.: PCT/EP2021/051957
§ 371 (c)(1),
(2) Date: May 9, 2022

(87) PCT Pub. No.: WO2021/151996
PCT Pub. Date: Aug. 5, 2021

(65) Prior Publication Data
US 2022/0390050 A1 Dec. 8, 2022

(30) Foreign Application Priority Data
Jan. 30, 2020 (DE) .................... 10 2020 102 277.8

(51) Int. Cl.
*F16L 29/02* (2006.01)
*F16L 41/16* (2006.01)

(52) U.S. Cl.
CPC .............. *F16L 29/02* (2013.01); *F16L 41/16* (2013.01)

(58) Field of Classification Search
CPC ................................. F16L 29/02; F16L 41/16
See application file for complete search history.

(56) References Cited

U.S. PATENT DOCUMENTS 2,524,052 A * 10/1950 Grant, Jr. ................ F16L 29/02
251/118
2,881,011 A * 4/1959 Coughlin ................ F16L 29/02
137/557

(Continued)

FOREIGN PATENT DOCUMENTS

DE        2628444 A1   12/1977
DE        4132690 A1   4/1993
WO        9946530 A1   9/1999

OTHER PUBLICATIONS

"Manufacturing Tomorrow" ("Understanding Screw Threading" by Alyssa Nutile/ManufacturingTomorrow, Published on Aug. 8, 2017). (Year: 2017).*

(Continued)

*Primary Examiner* — David Colon-Morales
(74) *Attorney, Agent, or Firm* — Rogowski Law LLC

(57) ABSTRACT

The invention relates to a connection fitting (102) for a valve coupling and/or measuring or test coupling (2) for fluid systems for detecting working pressures of fluid media, the coupling (2) comprising a coupling bushing (6) which is subject to operating pressure in the installed state and which has a connection part (16) and a borehole (10) in which a spring-loaded and mechanically actuatable non-return valve (32) is arranged, the valve body (18) of which, in the non-actuated state, is supported on a valve seat (52), the connection fitting (102) having an opening pin (114) having a more particularly circular, closed contact surface for the valve (32) and at least one passage (118) extending laterally to the contact surface, through which passage a connection can be established between the connection fitting (102) and the valve coupling and/or measuring or test coupling (2).

12 Claims, 3 Drawing Sheets

(56) References Cited

U.S. PATENT DOCUMENTS

| | | | | |
|---|---|---|---|---|
| 3,339,883 A * | 9/1967 | Drake | ............... | F16L 29/02 251/149.4 |
| 3,825,222 A * | 7/1974 | Petrova | ............... | F16L 29/02 251/149.6 |
| 4,063,708 A * | 12/1977 | Smith | ............... | F16L 33/224 251/149.6 |
| 4,186,910 A * | 2/1980 | Higami | ............... | F16L 29/02 251/149.6 |
| 4,193,419 A * | 3/1980 | Pellerito | ............... | F16L 29/02 137/322 |
| 4,253,488 A * | 3/1981 | Leverberg | ............... | F16L 29/02 251/149.6 |
| 4,527,587 A * | 7/1985 | Fairlamb | ............... | F16L 29/02 137/614.19 |
| 5,524,664 A * | 6/1996 | Lin | ............... | F16L 29/02 137/75 |
| 5,553,638 A * | 9/1996 | Home | ............... | F16L 29/02 251/149.6 |
| 5,738,335 A * | 4/1998 | Coutu | ............... | F16K 7/14 251/149.4 |
| 5,787,916 A * | 8/1998 | Shaw | ............... | F16K 37/00 137/557 |
| 6,279,608 B1 * | 8/2001 | Langeveld | ............... | F16L 41/16 137/557 |
| 6,892,999 B2 * | 5/2005 | Hall | ............... | G01N 1/2035 251/149.6 |
| 7,117,891 B2 * | 10/2006 | Magnus | ............... | F16L 29/02 251/149.6 |

OTHER PUBLICATIONS

"Dimide" ("Screw Thread Types and Their Benefits" by Emmet Costen/Dimide, Published on Jan. 7, 2020 (Year: 2020).*

* cited by examiner

CONNECTION FITTING FOR A VALVE COUPLING AND/OR TEST COUPLING FOR FLUID SYSTEMS FOR DETECTING FLUID PRESSURES AND FOR FILLING, EMPTYING AND VENTING FLUID SYSTEMS

CROSS-REFERENCE TO RELATED APPLICATIONS

This application is a national stage application (under 35 USC § 371) of PCT/EP2021/051957, filed Jan. 28, 2021, which claims benefit of DE 102020102277.8, filed Jan. 30, 2020, the contents of each of which is incorporated by reference herein.

BACKGROUND OF THE INVENTION

Technical Field and State of the Art

The invention relates to a connection fitting for a valve coupling and/or measuring coupling for fluid systems for detecting operating pressures of fluid media; the valve coupling and/or measuring coupling comprising a coupling bushing which is under operating pressure when in the installed and which has a connecting part, and with a drilled hole in which a spring-loaded and mechanically actuatable non-return valve is arranged whose valve body is supported on a valve seat when in the non-actuated state. The invention also relates to a fluid connection.

Valve couplings and/or measuring couplings of the above-mentioned type, which can also be referred to as non-return valves that can be mechanically unblocked, are already known and serve, for example, for the production of testing or measuring connections in pressure lines wherein, as a rule, the coupling bushing is firmly secured with its screwing thread in a fluid system. For the duration of the testing or measuring work, an opening pin configured as a hollow peg is screwed onto this coupling bushing by means of a cap nut or union nut, wherein said pin can be connected to a pressure sensor either directly or through a hose.

The couplings can be connected under pressure, that is to say, without shutting down the installation, to a connection fitting. Therefore, such valve couplings and measuring couplings allow the effective operating pressures to be measured directly in fluid systems, a process in which there is no need to relieve the pressure or to loosen venting screws or pipe screwed connections. Such couplings are used in a wide array of components and regulators of fluid systems.

After the coupling connection has been separated, a protective cap is usually screwed onto the coupling bushing with an external thread, a procedure that is aimed at preventing dirt from entering into the coupling bushing, while also having an additional sealing function in the eventuality that a non-return valve installed into the coupling bushing is not effectuating a completely tight seal. The sealing function is provided by a closed pin in the protective cap, wherein said pin, in the screwed-on state, is sunk in the secondary seal of the coupling bushing.

German patent application DE 41 32 690 A1 discloses a valve coupling and measuring coupling for fluid systems involving high operating pressures, very frequent pressure fluctuations and mechanical vibrations in order to measure pressures as well as a combination of pressures and temperatures. It comprises a coupling bushing into whose drilled hole there is a spring-loaded non-return valve with a sealing system.

A drawback of the connection of the prior-art valve couplings and measuring couplings in corresponding connection fittings is that these, as a rule, are designed for operating pressures up to a maximum of 630 bar. However, special installations require operating pressures of up to about 1000 bar for the coupling. In this context, a bursting-pressure resistance of at least 4000 bar and a long-term durability of 1,000,000 pressure pulses at 1330 bar are required. It should also be possible to undertake manual coupling under a pressure load of at least 700 bar.

SUMMARY OF THE INVENTION

Before this backdrop, the invention is based on the objective of improving a connection fitting for a valve coupling and/or measuring coupling in such a way that it reliably allows coupling procedures to be carried out without damage at elevated operating pressures. Moreover, a corresponding fluid connection is also to be put forward.

Regarding the connection fitting, this objective is achieved according to the invention in that the opening pin has an especially circular, closed contact surface for the valve, wherein the opening pin has at least one passage hole which runs laterally to the contact surface and through which a connection between the connection fitting and the valve coupling and measuring coupling can be established.

The invention is based on the consideration that prior-art connection fittings for measuring couplings cannot be coupled without damage at the mentioned high pressures. This is particularly due to the perforated configuration of the opening pin of the connection fitting since the pin becomes deformed during coupling at high pressures, so that a reliable connection is no longer possible.

As has now been recognized, the above-mentioned requirements can be fulfilled in that the opening pin has a closed contact surface for the valve, wherein this contact surface is not interrupted by perforations. Due to the non-continuous hole in the opening nipple, the pressure load from the valve acts upon a closed surface that can absorb greater forces without undergoing deformation than a perforated and slotted opening pin can, as has been the case for the measuring couplings so far. This allows damage-free coupling at very high pressures. Instead, the fluid connection between the connection fitting and the coupling is made possible by at least one passage hole arranged laterally to the contact surface.

The connection fitting can be firmly connected to the coupling bushing of the valve coupling and/or measuring coupling, wherein the spring-loaded valve body of the non-return valve arranged in the drilled hole of the coupling bushing can be slid axially against the spring resistance into the open position of the valve when the connection fitting is screwed on—in the application case by its opening pin—a process in which the insertion nipple seals off a secondary sealing system mounted on a multi-part sealing bushing.

Advantageously, there are between two and four, especially two, passage holes or openings.

As seen from the contact surface in the direction of the valve body, the passage holes run conically in the connection fitting towards the outside. The passage holes are preferably configured so as to be straight or in the form of a channel.

Advantageously, the connection fitting has a support collar to support a support bushing of a valve coupling and/or measuring coupling.

In a preferred embodiment, the connection fitting comprises a buttress internal thread to receive a buttress external thread of the connecting part of a valve coupling and/or measuring coupling, as a result of which thread friction and the required torque during coupling under pressure are reduced in comparison to conventional threads.

Regarding the fluid connection, the above-mentioned objective is achieved by means of a fluid connection comprising a connection fitting described above and a valve coupling and/or measuring coupling for fluid systems for purposes of detecting operating pressures of fluid media, comprising a coupling bushing that has a connecting part and that is under operating pressure in the installed state, and with a drilled hole in which a spring-loaded and mechanically actuatable non-return valve is arranged whose valve body is supported on a valve seat when in the non-actuated state, and which can be contacted by the contact surface of the opening pin, and wherein the connection fitting is designed to be screwed onto the connecting part of the valve coupling and/or measuring coupling.

The valve seat is preferably configured integrally in the coupling bushing or else secured in the coupling bushing by means of a joining method. In the prior-art measuring couplings, the valve is held by means of an insert that is screwed or inserted into the housing and subsequently flanged. As a rule, this screwing thread or even the flanging does not withstand these high pressures. This means that, in bursting-pressure tests, these couplings fail before a value of 4000 bar is reached. Since, according to the invention, the valve or the valve body is supported directly in the housing, in other words, inserted into the housing from the rear side of the coupling, there is no need for threads or flanged edges that would have to withstand these pressures. The statement that the valve seat is configured integrally in the housing preferably refers to a valve seat that is formed by an internal surface or inner surface of the housing. In particular, it indicates that the valve seat does not comprise any additional components or parts.

Advantageously, the valve seat has an inner contour with a first section that runs parallel to the axial direction of the drilled hole, and a second section that tapers in the direction of the coupling bushing, wherein an outer contour of the valve body is configured in certain areas so as to have a shape that is congruent with the two sections so that the direct support of the valve body on the coupling bushing can reliably fulfill the requisite parameters in terms of the bursting pressure, durability and the like. The fact that the valve is supported directly on the housing entails a considerable production advantage in comparison to the prior-art valve couplings and measuring couplings since the quality of a mechanical deformation, flanging or screwed connection during the production process no longer needs to be controlled, so that stabilization of the valve is always attained, even in the case of manufacturing tolerances.

The valve coupling and measuring coupling preferably comprises a sealing ring that is arranged in a groove of the valve body, wherein the groove has a trapezoidal cross section that tapers in the radial direction. The resulting chambering of the sealing ring or O-ring by means of the trapezoidal groove prevents the O-ring from being pulled out if the valve is open and under high throughput rates, thus also preventing the resulting blockage of the flow cross section.

Preferably, when the valve is closed, the sealing ring does not sit completely in the part of the drilled hole that constitutes a section of the valve seat, so that a larger throughput cross section is freed up already in the case of a slight valve lift.

In a preferred embodiment, the valve body is structured in two parts, namely, a receiving part and an insertion part, wherein the receiving part has a blind hole that receives a peg of the insertion part, wherein the groove for the sealing ring is formed between a collar of the insertion part and a collar of the receiving part. During the production of the measuring coupling, the sealing ring can be placed on the collar of the receiving part, after which the peg of the insertion part is inserted into the blind hole of the receiving part so that the sealing ring is arranged in the trapezoidal groove.

Preferably, the coupling bushing has an external thread that is configured in the form of external buttress gearing. The configuration of a thread with a buttress profile in the appertaining orientation translates into a reduction of the thread friction and consequently of the required torque during coupling under pressure.

The configuration of the described valve coupling and/or measuring coupling constitutes an autonomous inventive achievement. The invention also relates to a valve coupling and/or measuring coupling for fluid systems for detecting operating pressures of fluid media; the valve coupling and/or measuring coupling comprising a coupling bushing which is under operating pressure when in the installed state and which has a connecting part, and with a drilled hole in which a spring-loaded and mechanically actuatable non-return valve is arranged whose valve body is supported on a valve seat when in the non-actuated state. The features described in the claims and in the description constitute advantageous embodiments of the valve coupling and/or measuring coupling.

The advantages of the invention lie especially in that a closed contact surface of the opening pin and the lateral arrangement of passage holes allow coupling to be carried out at high pressures without damage, as a result of which the reliability during coupling and the service life of the connection fitting and of the coupled valve coupling and/or measuring coupling are enhanced.

Therefore, the connection fitting for the coupling differs from the prior-art solutions in that the opening pin is not a through-hole. This would give rise to the problem that the valve in the valve coupling and measuring coupling having a circular cross section would need to be pressed on. The surface of the circular cross section, however, would be so small that the valve body would deform plastically during coupling under high pressures, thus damaging the connection fitting. Consequently, the opening pin is preferably not a through-hole and it is pressed with a closed surface onto the valve, so that less surface pressure is exerted onto the opening pin.

The formation of the valve seat directly inside the coupling bushing allows operation of the valve coupling and measuring coupling at pressures of 1000 bar or higher. The configuration of the seat of the valve directly in the coupling bushing entails a production advantage since the quality of a mechanical deformation, flanging or screwed connection during the production process does not need to be controlled, so that stabilization of the valve is always attained, even in the case of manufacturing tolerances.

The configuration of a buttress profile on the external thread of the coupling bushing reduces the thread friction in one direction. In this context, it is possible to achieve a considerable reduction of the opening torque in comparison to an equivalent standard thread.

Additional objectives, advantages, features and application possibilities of the present invention ensue from the description below of an embodiment making reference to the drawing. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

The following is shown.

Identical components are provided with the same reference numerals in all of the figures.

DETAILED DESCRIPTION

Figure 1:
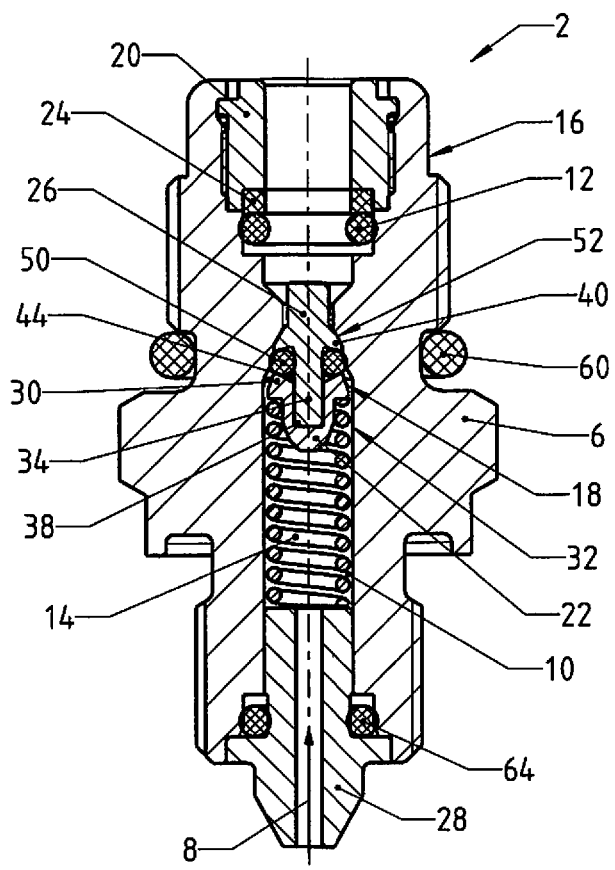
FIG. 1 a valve coupling and measuring coupling in a preferred embodiment, in a cross-sectional depiction.

A valve coupling and/or measuring coupling 2 as shown in FIG. 1 for measuring the pressure, for filling, emptying and venting fluid media comprises a coupling bushing 6 with a drilled hole 10 which runs in the axial direction 8 and into which a spring 14 is arranged. The valve coupling and/or measuring coupling 2 has a connecting part 16 with which it can be connected to a matching connection fitting 102 (see FIG. 4). In the coupling bushing 6, there is a support bushing 20 that, together with the coupling bushing 6, forms a sealing ring groove for a retaining ring 24 and for a secondary sealing ring 12. The retaining ring 24 prevents gap extrusion of the secondary sealing ring in the coupled state when exposed to high pressures.

A valve body 18 is structured in two parts, namely, a receiving part 22 and an insertion part 26 that can be partially inserted into it. The receiving part 22 extends in the axial direction into the spring 14 and it has a collar 30 that is supported on the spring 14. The insertion part 26 comprises a peg 34 that is inserted into a blind hole 38 of the receiving part 22. A collar 40 adjoins the peg 34 in the axial direction towards the connecting part 16. The two collars 30 and 40 form between themselves a groove 44 that has a trapezoidal cross section. A sealing ring 50 or O-ring is arranged in the groove 44. In the non-actuated state, that is to say, when no connection fitting 102 (see FIG. 4) has been screwed onto the connecting part 16, the valve body 18 is supported on a valve seat 52. The valve body 18, the spring 14 and the valve seat 52 form a non-return valve 32.

The measuring coupling 2 has a retaining ring 60 against vibration which, when a connection fitting 102 is screwed onto a measuring coupling 2, protects a cap nut 104 (see FIG. 4) from becoming detached due to vibration. The measuring coupling 2 has a perforated end plug 28 that is inserted into the drilled hole 10 so that the connection to the fluid system is established. A sealing ring 64 ensures a tight seal between the coupling bushing 6 and the end plug 28.

Figure 2:
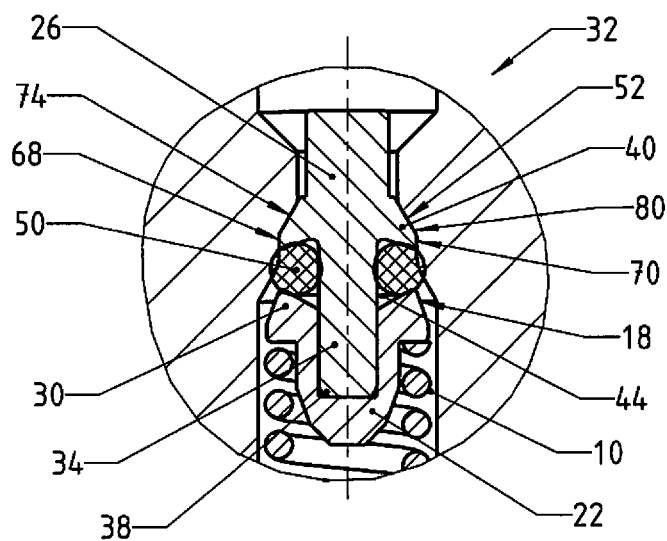
FIG. 2 a sectional view of the valve coupling and measuring coupling as shown in FIG. 1.

FIG. 2 shows a sectional view of the measuring coupling 2 (see FIG. 1). The valve seat 52 has an inner contour 68 with a first section 70 that runs parallel to the axial direction of the drilled hole 10, and a second section 74 that tapers in the direction of the connecting part 16 (see FIG. 1). Here, the section 74 tapers towards the connecting part 16 in the radial direction and especially becomes increasingly narrower. For purposes of attaining a firm and reliable seat of the valve body 18 in the valve seat 52, the valve body 18—here the insertion part 26—has an outer contour 80 that is configured in certain areas so as to have a shape that is congruent with the two sections 70, 74.

The groove 44 having a trapezoidal cross section is formed between the collars 30, 40 of the two parts 22, 26 of the valve body 18, wherein the wider bottom side of the trapezoid is situated radially further inside than the shorter side of the trapezoid that is essentially parallel thereto. The sealing ring 50 is arranged in the groove 44. The trapezoidal cross section of the groove 44 translates into a firm and stable seat of the sealing ring 50 in the groove 44.

Figure 3:
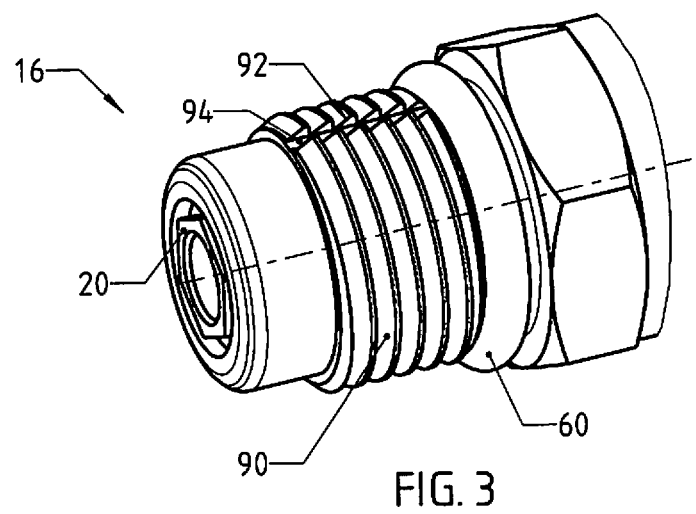
FIG. 3 a connecting part having a buttress thread of the valve coupling and measuring coupling as shown in FIG. 1.

FIG. 3 shows the connecting part 16 of the valve coupling and/or measuring coupling 2 onto which a connection fitting 102 with an opening pin 114 (see FIG. 4) is screwed, for instance, for pressure measurements. The connecting part 16 has an external thread 90 with a buttress contour 92. In the axial direction, the external thread is interrupted in at least one place by a groove 94 through which a fluid can escape to the outside during de-coupling.

Figure 4:
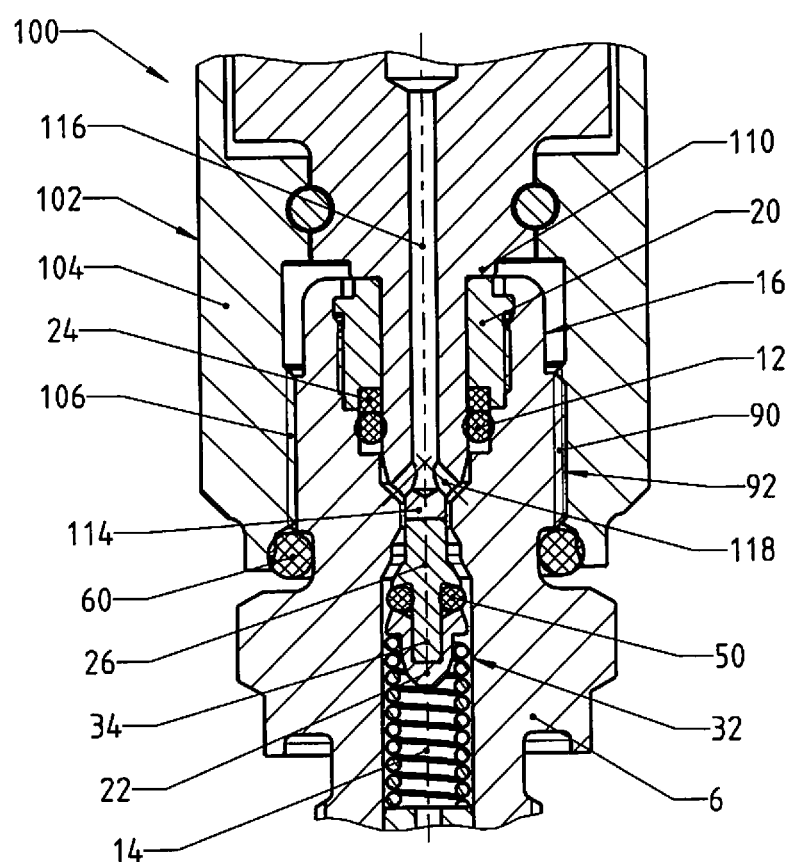
FIG. 4 a connection fitting and a valve coupling and measuring coupling in the coupled, opened state.

FIG. 4 shows a section of a fluid connection 100 with a connection fitting 102 and the valve coupling and/or measuring coupling 2 as shown in FIGS. 1 to 3. Here, the connection fitting 102 has been screwed into the connecting part 16 of the valve coupling and/or measuring coupling 2. For this purpose, the connection fitting 102 has an internal thread 106 that matches the external thread 92 of the connecting part. The connection fitting 102 also has a support collar 110 which, in the screwed state, supports the support bushing 20. In the coupled state, the operating pressure acts upon the secondary seal 12 and thus on the screwed-on support bushing 20. Additionally, in the coupled state, the connection fitting 102 presses onto the support bushing 20, thus likewise bearing some of the pressure forces.

The connection fitting 102 has a channel 116 that opens into an opening pin 114 so that, via passage holes 118 installed laterally at an angle, it is possible to establish the fluid connection to the fluid that is at a high pressure in the valve coupling and/or measuring coupling 2. The drilled hole in the opening pin 114 is configured so as not to be continuous. Owing to the non-continuous hole in the opening pin 114, the pressure load exerted by the valve acts upon a closed surface which can absorb greater forces without deformation than a perforated and slotted nipple can, as has been the case with the prior-art valve couplings and/or measuring couplings. This allows damage-free coupling under very high pressures. FIG. 4 shows the fluid connection 100 in a pressure situation in which the valve is open.

Figure 5:
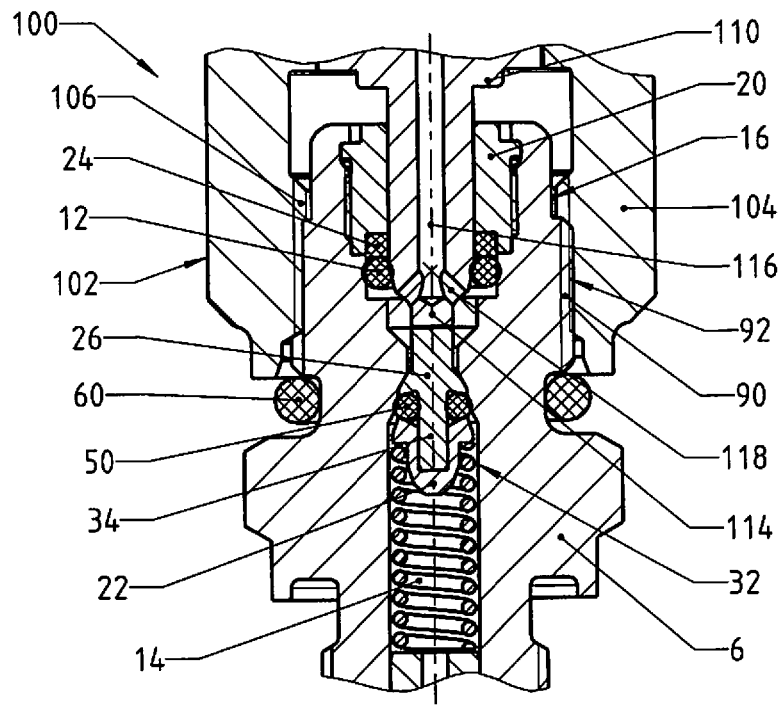
FIG. 5 the connection fitting and the valve coupling and measuring coupling as shown in FIG. 4 during the de-coupling procedure, with a valve that has just been closed.
Figure 6:
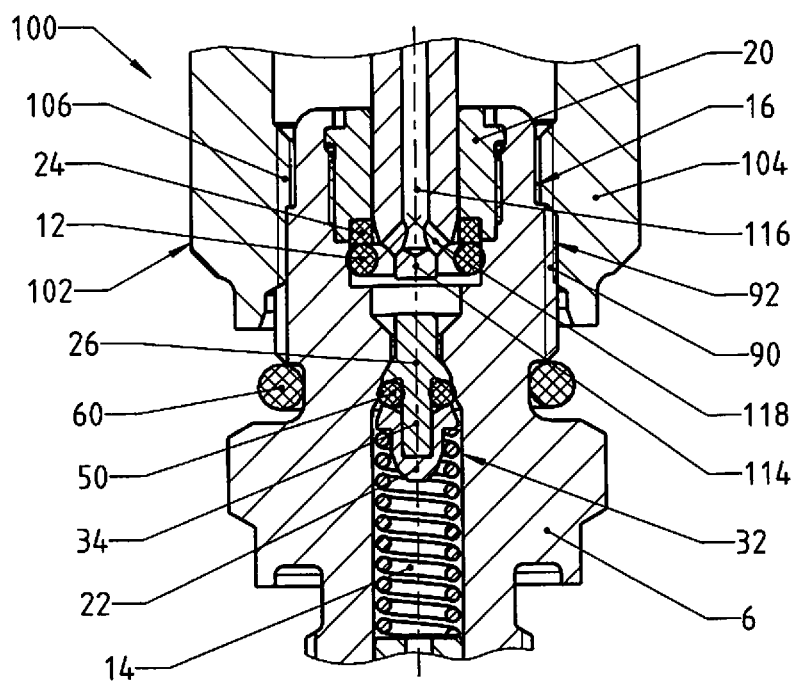
FIG. 6 the connection fitting and the valve coupling and measuring coupling as shown in FIG. 4 during the de-coupling procedure.

FIG. 5 shows the fluid connection 100 with a closed valve 32. Here, the valve 32 has just been closed, while the opening pin 114 continues to be sealed off by the secondary seal 12. In FIG. 6, which shows another instance of de-coupling, the opening pin 114 emerges from the secondary seal 12. Fluid present under pressure in the connection fitting 102 can escape to the outside through the groove 94 (see FIG. 3) in the coupling thread and through the gap between the support bushing 20 and the opening pin 114. In the condition depicted here, the external thread 90 of the connecting part 16 is still engaged with the matching internal thread 106 of the connection fitting 102.

Since the internal thread 106 of the connection fitting 102 is still engaged when the opening pin emerges from the secondary seal 12, the user is warned by the escaping fluid that the connection fitting 102 is still under pressure. If that were not the case, particularly when dealing with gaseous fluids, the pressure would be abruptly relieved when the last thread is freed and could injure the user.

LIST OF REFERENCE NUMERALS 2 measuring coupling
6 coupling bushing
8 axial direction
10 drilled hole
12 secondary seal
14 spring
16 connecting part
18 valve body
20 support bushing
22 receiving part
24 retaining ring
26 insertion part
28 end plug
30 collar
32 non-return valve
34 peg
38 blind hole
40 collar
44 groove
50 sealing ring
52 valve seat
60 retaining ring against vibration
64 sealing ring
68 inner contour
70 first section
74 second section
80 outer contour
90 external thread
92 buttress contour
94 groove
100 fluid connection
102 connection fitting
104 cap nut or union nut
106 internal thread
110 support collar
114 opening pin
116 channel
118 passage hole

The invention claimed is:

1. A connection fitting (102) for detecting operating pressures of fluid media, comprising:
an opening pin (114) with a substantially circular, closed contact surface for a spring-loaded and mechanically actuatable non-return valve (32), said valve (32) having a valve body (18) that is supported on a valve seat (52) when in a non-actuated state, said valve (32) being arranged in a drilled hole (10) of a connecting part (16) of a coupling bushing (6) which is under operating pressure,
wherein the opening pin (114) has at least one passage hole (118) which runs laterally to the contact surface and through which a connection between the connection fitting (102) and a valve coupling or measuring coupling (2) for fluid systems can be established;
wherein the connection fitting (102) is configured to be screwed onto a connecting part (16) of the valve coupling or measuring coupling (2),
wherein the valve coupling or measuring coupling (2) comprises a sealing ring (50) that is arranged in a groove (44) of the valve body (18), and
wherein the groove (44) has a trapezoidal cross section that tapers in the radial direction.

2. The connection fitting (102) according to claim 1, wherein there are between two and four passage holes (118) in the opening pin (114).

3. The connection fitting (102) according to claim 2, wherein, as seen from the contact surface in the direction of the valve body (18), the passage holes (118) run conically towards the outside.

4. The connection fitting (102) according to claim 1, further comprising a support collar (110) to support a support bushing (20) of the valve coupling and/or measuring coupling (2).

5. The connection fitting (102) according to claim 1, further comprising a buttress internal thread (106) to receive a buttress external thread (90) of the connecting part (16) of the valve coupling and/or measuring coupling (2).

6. A fluid connection (100), comprising:
a connection fitting (102) having an opening pin (114) with a substantially circular, closed contact surface for a spring-loaded and mechanically actuatable non-return valve (32), and having at least one passage hole (118) which runs laterally to the contact surface; and
a valve coupling and/or measuring coupling (2) for fluid systems for purposes of detecting operating pressures of fluid media, comprising a coupling bushing (6) that has a connecting part (16) and that is under operating pressure in the installed state, and with a drilled hole (10) in which the spring-loaded and mechanically actuatable non-return valve (32) is arranged whose valve body (18) is supported on a valve seat (52) when in the non-actuated state, and which can be contacted by the contact surface of the opening pin (114),
wherein the connection fitting (102) is configured to be screwed onto the connecting part (16) of the valve coupling and/or measuring coupling (2),
wherein the valve coupling and/or measuring coupling (2) comprises a sealing ring (50) that is arranged in a groove (44) of the valve body (18), and
wherein the groove (44) has a trapezoidal cross section that tapers in the radial direction.

7. The fluid connection (100) according to claim 6, wherein the valve seat (52) is configured integrally in the coupling bushing (6) or alternatively secured in the coupling bushing (6).

8. The fluid connection (100) according to claim 6 wherein the valve seat (52) has an inner contour (68) with a first section (70) that runs parallel to the axial direction of the drilled hole (10), and a second section (74) that tapers in the direction of the coupling bushing, and wherein an outer contour (80) of the valve body (18) is configured in certain areas so as to have a shape that is congruent with the two sections (70, 74).

9. The fluid connection (100) according to claim 6, wherein, when the valve is closed, the sealing ring (50) does not sit completely in the part of the drilled hole that constitutes a section of the valve seat (52).

10. The fluid connection (100) according to claim 6, wherein the valve body (18) is structured in two parts, namely, a receiving part (22) and an insertion part (26), and wherein the receiving part (22) has a blind hole (38) that receives a peg (34) of the insertion part (26), and wherein the trapezoidal groove (44) for the sealing ring (50) is formed between a collar (40) of the insertion part (26) and a collar (30) of the receiving part (22).

11. The fluid connection (100) according to claim 6, wherein the connecting part (16) has an external thread (90) that is configured in the form of external buttress gearing, and wherein the connection fitting (102) comprises a buttress internal thread (106) to receive the buttress external thread (90) of the connecting part (16) of the valve coupling and/or measuring coupling (2).

12. A fluid connection, comprising:
 a connection fitting having an opening pin with a substantially circular, closed contact surface for a spring-loaded and mechanically actuatable non-return valve, and having at least one passage hole which runs laterally to the contact surface; and
 a valve coupling comprising a coupling bushing that has a connecting part,
 wherein said coupling bushing has a drilled hole in which the spring-loaded and mechanically actuatable non-return valve is arranged whose valve body is supported on a valve seat when in the non-actuated state, and which can be contacted by the contact surface of the opening pin,
 wherein the valve body has a receiving part and an insertion part,
 wherein the receiving part has a blind hole that receives a peg of the insertion part,
 wherein a groove for a sealing ring has a trapezoidal cross section that tapers in the radial direction, with said groove being formed between a collar of the insertion part and a collar of the receiving part, and
 wherein the connection fitting is configured to be screwed onto the connecting part of the valve coupling.

* * * * *